US012810051B2

(12) United States Patent
Winston

(10) Patent No.: US 12,810,051 B2
(45) Date of Patent: Nov. 24, 2026

(54) SERIAL WIRE TIMER DISTRIBUTION

(71) Applicant: SiFive, Inc., San Mateo, CA (US)

(72) Inventor: Marcus Winston, Beaverton, OR (US)

(73) Assignee: SiFive, Inc., Santa Clara, CA (US)

( * ) Notice: Subject to any disclaimer, the term of this patent is extended or adjusted under 35 U.S.C. 154(b) by 663 days.

(21) Appl. No.: 18/473,351

(22) Filed: Sep. 25, 2023

(65) Prior Publication Data

US 2024/0281587 A1 Aug. 22, 2024

Related U.S. Application Data

(60) Provisional application No. 63/447,344, filed on Feb. 21, 2023.

(51) Int. Cl.

*G06F 30/30* (2020.01)
*G06F 30/392* (2020.01)
*G06F 115/02* (2020.01)

(52) U.S. Cl.

CPC ........ *G06F 30/392* (2020.01); *G06F 2115/02* (2020.01)

(58) Field of Classification Search

USPC ......................... 716/106, 108, 111, 113, 138
See application file for complete search history.

(56) References Cited

U.S. PATENT DOCUMENTS 6,314,530 B1 * 11/2001 Mann .................... G06F 11/348 714/E11.212
7,295,578 B1 * 11/2007 Lyle .......................... G06F 3/14 348/473
7,558,326 B1 * 7/2009 Lyle ........................ H04L 1/203 348/478
2006/0267640 A1 * 11/2006 Travis ....................... H03L 7/10 327/105
2012/0155588 A1 * 6/2012 Goh ........................ H03L 7/089 375/362

* cited by examiner

*Primary Examiner* — Brian Ngo
(74) *Attorney, Agent, or Firm* — Kilpatrick Townsend & Stockton LLP

(57) ABSTRACT

Systems and methods are disclosed for serial wire timer distribution in an SoC. For example, some methods may include adding an offset to a current timestamp to obtain an offset timestamp; serially transmitting the offset timestamp on a first conductor according to a functional-logic clock signal; receiving the offset timestamp via the first conductor; and writing the offset timestamp to a timestamp register at a time according to an edge of a fixed-frequency reference clock signal on a second conductor.

20 Claims, 6 Drawing Sheets

SERIAL WIRE TIMER DISTRIBUTION

CROSS-REFERENCES TO RELATED APPLICATIONS

This application claims priority to and the benefit of U.S. patent application Ser. No. 63/447,344, filed on Feb. 21, 2023, the entire disclosure of which is hereby incorporated by reference.

TECHNICAL FIELD

This disclosure relates to serial wire timer distribution in an integrated circuit.

BACKGROUND

A System-on-Chip (SoC) is an integrated circuit that includes multiple components, devices, modules, cores, tiles, or blocks connected to one another (hereafter sometimes simply "cores"). The cores may include, for example, processor cores and other intellectual property (IP) blocks. Each core may utilize a timestamp for a variety of purposes, including debugging and performance profiling.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
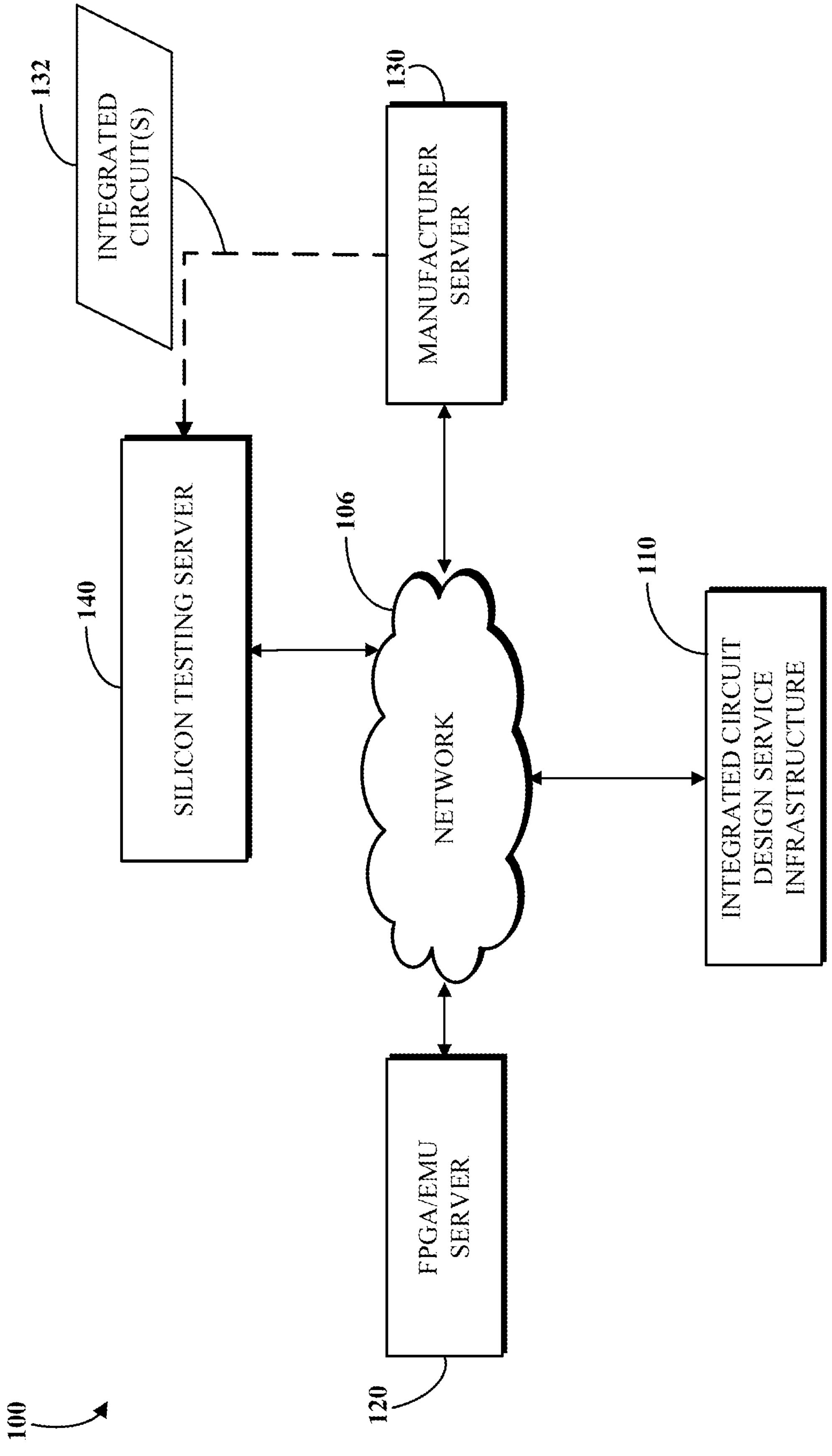
FIG. 1 is block diagram of an example of a system for facilitating generation and manufacture of integrated circuits.

Disclosed herein are implementations of serial wire timer distribution in an SoC. Distributing copies of a system's global timestamp to multiple cores therein (e.g., processor cores) in a large system can provide those cores with faster, more accurate, and reliable access to timestamps. These timestamps can be used for a variety of purposes, including debugging and performance profiling. Some implementations may provide advantages, such as reducing a quantity of conductors (e.g., copper traces or wires) needed to distribute a global timestamp to multiple cores on an integrated circuit (e.g., to multiple processor cores on an SoC).

As used herein, the term "circuitry" refer to an arrangement of electronic components (e.g., transistors, resistors, capacitors, and/or inductors) that is structured to implement one or more functions. For example, a circuitry may include one or more transistors interconnected to form logic gates that collectively implement a logic function. As used herein, a "timer" comprises circuitry that establishes and/or updates a timer value (e.g., increments the time value for an up-counter, or decrements the time value for a down-counter). Terms "timer" and "counter" may be used interchangeably herein, and terms "timer value" and "timestamp" may be used interchangeably herein. Terms "clock cycle" and "clock period" may be used interchangeably herein. Terms "clock" and "clock signal" may be used interchangeably herein.

32-bit and 64-bit timestamps, or timer values, are common in contemporary computing (SoC) products. High-resolution and high-accuracy timestamps may be an important aspect of modern computer systems. Some processor cores, and often other intellectual property (IP) blocks in an SoC, may require very low-latency access to the system's global timer, for hardware, software, and/or firmware uses. Some implementations disclosed herein are designed to accommodate this and other requirements of modern SoC design.

For example, contemporary computing SoC products may actively and aggressively manage (minimize) their power consumption, especially for battery-powered products. When the processor cores and/or SoC IP blocks in these products are brought out of reset at different times or are powered on and off at various times (depending on the needs and power state of the SoC), starting all timestamp counters at power-up or at reset deassertion may be infeasible. While, in theory, all timestamp-counter logic could operate on a single, always-on, always-running clock and power domain, this would be a simplistic solution that may not meet the ultra-low power consumption requirements of many contemporary computing products. Thus, in addition to high-accuracy and high-resolution timestamps, dynamic (run-time) clock- and power-gating may be accommodated in contemporary computing products. A method to copy, or distribute, the system's global timestamp to all processor cores and/or IP blocks when they need it may be included to enable a total system solution.

In multi- and many-core SoCs there may be two important constraints: (1) distributing the timestamp in a way that ensures all intended processor cores and/or IP blocks receive the timestamp, and (2) maintaining that timestamp in such a way that all intended processor cores and/or IP blocks have an identical value, or notion, of time. These constraints may present physical-design challenges that are disproportionately large compared to the relative simplicity of the time-stamping feature. Therefore, "scalability"—where the resources required to distribute a timestamp may scale linearly or sub-linearly (e.g., logarithmically) with a number of intended processor cores and/or IP blocks—may also be an intrinsic requirement.

Some implementations described herein may include a serial data protocol, with an intrinsic synchronization point (an intrinsic "sync point" in time), that is used in a procedure to send a timestamp and provide a synchronization signal to all receivers, or clients. Hereafter, cores of an SoC (e.g., processor cores and/or IP blocks) that receive and/or store a transmitted timestamp may be referred to generally as "receivers" or "clients," and a device that transmits a timestamp to a client may be referred to generally as a "sender" or "server." An important aspect of several implementations is determining a future value of a timestamp, when the timestamp is prepared for transmittal to the receiver(s), that accounts for a transmission time of the timestamp from sender to receiver(s). Such a future value may be referred to herein as an "offset timestamp," which is described more fully later herein.

Some implementations utilize one timestamp server, or sender, and one or more timestamp receivers (clients), and one data-signal conductor, or datapath, connecting the server to the one or more receives. In some implementations, a timestamp may be first prepared, or adjusted, by the sender prior to transmission thereof. Preparation involves calculating a future value of the timestamp (the offset timestamp) at a specified future synchronization point (i.e., at a specified future point in time).

Some implementations may utilize two clock signals: one that has a fixed frequency, and is usually a high-precision reference clock; and another that is a functional clock for certain logic circuitry of the SoC, which usually has less-stringent accuracy requirements.

Since there may be no established phase or frequency relationships between the fixed-frequency reference clock (referred to herein as a real-time clock toggle sync, or "rtc_toggle_sync") and the functional-logic clock, some implementations may accommodate any functional-logic clock frequency that is equal to or greater than twice the rtc_toggle_sync frequency.

To describe some implementations in greater detail, reference is first made to examples of hardware and software structures used to implement a system including components that may distribute a timestamp via serial wire in an SoC. FIG. 1 is block diagram of an example of a system 100 for generation and manufacture of integrated circuits. The system 100 includes a network 106, an integrated-circuit design-service infrastructure 110, a field-programmable gate array (FPGA)/emulator server 120, and a manufacturer server 130. For example, a user may utilize a web client or a scripting API client to command the integrated-circuit design-service infrastructure 110 to automatically generate an integrated-circuit design based a set of design parameter values selected by the user for one or more template integrated-circuit designs. In some implementations, the integrated-circuit design-service infrastructure 110 may be configured to generate an integrated-circuit design that includes the circuitry shown and described in FIG. 3.

The integrated-circuit design-service infrastructure 110 may include a register-transfer level (RTL) service module configured to generate an RTL data structure for the integrated circuit based on a design-parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high-level set of configuration settings using a mix of Diplomacy, Chisel, and FIRRTL. The RTL service module may take the design parameters data structure (e.g., a JavaScript object notation (JSON) file) as input and output an RTL data structure (e.g., a Verilog file) for the chip.

In some implementations, the integrated-circuit design-service infrastructure 110 may invoke (e.g., via network communications over the network 106) testing of the resulting design that is performed by the FPGA/emulation server 120 that is running one or more FPGAs or other types of hardware or software emulators. For example, the integrated-circuit design-service infrastructure 110 may invoke a test using a FPGA, programmed based on a FPGA emulation data structure, to obtain an emulation result. The FPGA may be operating on the FPGA/emulation server 120, which may be a cloud server. Test results may be returned by the FPGA/emulation server 120 to the integrated-circuit design-service infrastructure 110 and relayed in a useful format to the user (e.g., via a web client or a scripting API client).

The integrated-circuit design-service infrastructure 110 may also facilitate the manufacture of integrated circuits using the integrated-circuit design in a manufacturing facility associated with the manufacturer server 130. In some implementations, a physical-design specification (e.g., a graphic data system (GDS) file, such as a GDS II file) based on a physical-design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical-design specifications (e.g., as a GDSII file or an OASIS file) to schedule or otherwise facilitate fabrication of integrated circuits. In some implementations, the integrated-circuit design-service infrastructure 110 supports multi-tenancy to allow multiple integrated-circuit designs (e.g., from one or more users) to share fixed costs of manufacturing (e.g., reticle/mask generation, and/or shuttles wafer tests). For example, the integrated-circuit design-service infrastructure 110 may use a fixed package (e.g., a quasi-standardized packaging) that is defined to reduce fixed costs and facilitate sharing of reticle/mask, wafer test, and other fixed manufacturing costs. For example, the physical-design specification may include one or more physical designs from one or more respective physical-design data structures to facilitate multi-tenancy manufacturing.

In response to the transmission of the physical-design specification, the manufacturer associated with the manufacturer server 130 may fabricate and/or test integrated circuits based on the integrated-circuit design. For example, the associated manufacturer (e.g., a foundry) may perform optical proximity correction (OPC) and similar post-tapeout/pre-production processing, fabricate the integrated circuit(s) 132, update the integrated-circuit design-service infrastructure 110 (e.g., via communications with a controller or a web application server) periodically or asynchronously on the status of the manufacturing process, perform appropriate testing (e.g., wafer testing), and send to a packaging house for packaging. The packaging house may receive the finished wafers or dice from the manufacturer and test materials and update the integrated-circuit design-service infrastructure 110 on the status of the packaging and delivery process periodically or asynchronously. In some implementations, status updates may be relayed to the user when the user checks in using the web interface and/or the controller might email the user that updates are available.

In some implementations, the resulting integrated circuits 132 (e.g., physical chips) are delivered (e.g., via mail) to a silicon-testing service provider associated with a silicon-testing server 140. In some implementations, the resulting integrated circuits 132 (e.g., physical chips) are installed in a system controlled by silicon-testing server 140 (e.g., a cloud server) making them quickly accessible to be run and tested remotely using network communications to control the operation of the integrated circuits 132. For example, a login to the silicon-testing server 140 controlling a manufactured integrated circuits 132 may be sent to the integrated-circuit design-service infrastructure 110 and relayed to a user (e.g., via a web client). For example, the integrated-circuit design-service infrastructure 110 may control testing of one or more integrated circuits 132, which may be structured based on an RTL data structure.

Figure 2:
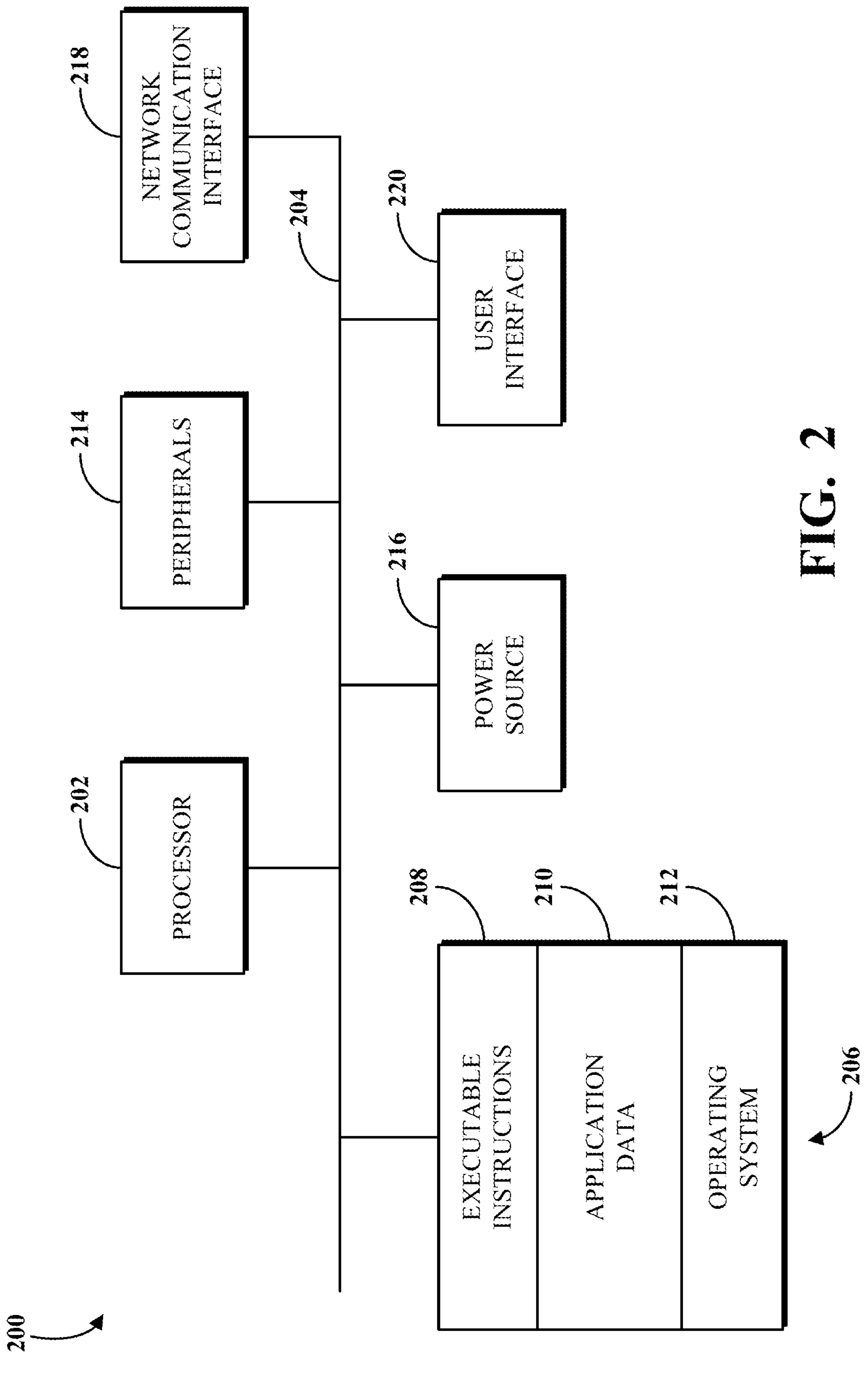
FIG. 2 is block diagram of an example of a system for facilitating generation of integrated circuits.

FIG. 2 is block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated-circuit design-service infrastructure 110, and/or to generate a file that generates a circuit representation of an integrated circuit design including the circuitry shown and described in FIG. 3. The system 200 can include components or units, such as a processor 202, a bus 204, a memory 206, peripherals 214, a power source 216, a network communication interface 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as double data rate (DDR) synchronous dynamic random access memory (SDRAM), and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as RAM, and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated-circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), wireless fidelity (Wi-Fi), infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field-programmable gate array (FPGA), application specific integrated circuit (ASIC), system-on-a-chip (SoC), or some combination thereof. A computer may process the circuit representation to program or manufacture an integrated circuit, which may include programming an FPGA or manufacturing a ASIC or an SoC. In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
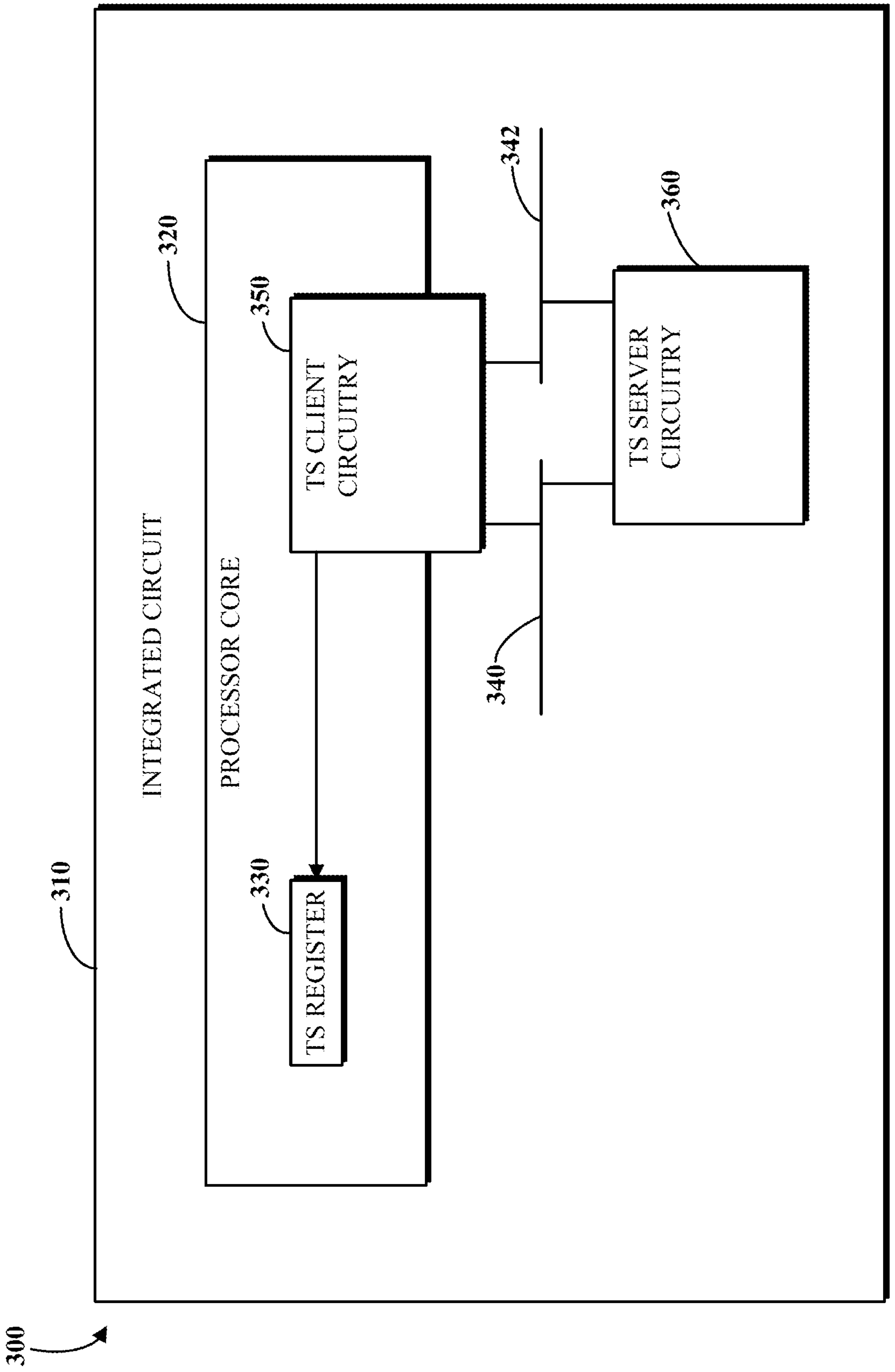
FIG. 3 is a block diagram of an example of an integrated circuit for serial wire timer distribution.

FIG. 3 is a block diagram of an exemplary system 300 including circuitry comprising one or more servers (or senders) and one or more clients (or receivers). The system 300 could be implemented, for example, by an SoC. The system 300 comprises an integrated circuit 310 that includes a timestamp register 330 that is configured to store a timestamp. The integrated circuit 310 comprises a first conductor 340 that is configured to bear a timestamp signal that is serialized according to a first clock signal. The integrated circuit further comprises a second conductor 342 that is configured to bear a fixed-frequency reference clock signal that has a lower frequency than the first clock signal. The integrated circuit 310 further comprises a timestamp server circuitry 360 that is configured to add an offset to a current timestamp to obtain an offset timestamp, and to serially transmit the offset timestamp on the first conductor 340. The integrated circuit 310 further comprises a timestamp client circuitry 350 that is configured to receive the offset timestamp via the first conductor 340, and to write the offset timestamp to the timestamp register 330 at a time based on an edge of the fixed-frequency reference clock signal. For example, the first clock signal and the fixed-frequency reference clock signal may respectively be the functional-logic clock 510 and the reference clock 520 of FIG. 5. For example, the system 300 may be used to implement the process 600 of FIG. 6.

The offset may be determined based on one or more parameters, values, data elements, circuit elements, mathematical functions, mathematical relationships, and so on, where "based on X" is open-ended and means "based on at least X." In some implementations, the timestamp server circuitry 360 is configured to determine the offset based on a ratio of a frequency of the fixed-frequency reference clock signal to a frequency of the first clock signal. For example, the fixed-frequency reference clock signal may have a frequency of 100 MHz and the first clock signal may have a frequency of 500 MHz. Thus, a ratio of the fixed-frequency reference clock signal to the first clock signal would be 100 MHz/500 MHz=⅕, or 0.20.

In some implementations, the timestamp server circuitry 360 is configured to determine the offset based on a quantity of clock cycles of the first clock signal. In some implementations, the quantity of clock cycles may be predetermined, for example, based on an architecture, layout, or functionality of the integrated circuit 310. In some implementations, the quantity of clock cycles may be determined using circuitry that implements a finite state machine such as a binary counter or a grey-code counter.

In some implementations, the timestamp server circuitry 360 is configured to determine the offset based on a quantity of sequential circuit elements on a datapath between the timestamp server circuitry 360 and the timestamp client circuitry 350 that includes the first conductor 340. In some implementations, the sequential circuit elements may be flip-flops and/or latches.

In some implementations, the timestamp server circuitry 360 is configured to determine the offset based on a value stored by software in a register. The software may comprise an operating system or a kernel thereof, such as Linux, or one or more device drivers.

In some implementations, transmittal of the offset timestamp from the timestamp server circuitry 360 to the timestamp client circuitry 350 may be delayed by an amount that causes receipt of the transmitted offset timestamp to complete immediately prior to the intrinsic sync point.

In some implementations, the timestamp server circuitry 360 is configured to determine the offset based on a combination of a value stored by software in a register and a quantity of sequential circuit elements on a datapath between the timestamp server circuitry 360 and the timestamp client circuitry 350 that includes the first conductor 340.

In some implementations, the timestamp register 330 is a control status register of the processor core 320.

In some implementations, the timestamp register 330 is configured to be accessed by the processor core 320 in a fixed or otherwise known quantity of clock cycles of a clock signal used by the processor core 320, where the fixed or otherwise known quantity may depend on a current and quantifiable activity level of the processor core (e.g., quantities or types of threads, arithmetic operations, memory accesses, and so on) and/or on a given performance specification of the processor core (e.g., a low-end processor core may require a greater quantity of fixed or otherwise known clock cycles compared to a high-end processor core). In some implementations, the clock signal used by the processor core may have a different frequency than the first clock signal. For example, the first clock signal may have a frequency of 500 MHz and the clock signal used by the processor core 320 may have a frequency of 1 GHz. In some implementations, the phase relationship between the first clock signal and the clock signal used by the processor core 320 may be synchronous, mesochronous, plesiochronous, or asynchronous.

In some implementations, the timestamp client circuitry 350 is configured to implement a clock-domain crossing from a clock domain shared by the timestamp client circuitry 350 and the timestamp server circuitry 360 to a clock domain of the processor core 320.

In some implementations, the timestamp server circuitry 360 is configured to transmit the offset timestamp serially within a fixed or otherwise known number of periods of the fixed-frequency reference clock signal.

In some implementations, the integrated circuit 310 may include multiple processor cores that maintain their own timestamp registers that are updated based on signals transmitted via the first conductor 340 and the second conductor 342. For example, the integrated circuit 310 may include multiple processor cores including respective timestamp registers configured to store a timestamp; and multiple timestamp client circuitries 350 configured to receive the offset timestamp via the first conductor 340, and to write the offset timestamp to the respective timestamp registers at a time based on an edge of the fixed-frequency reference clock signal. For example, the integrated circuit may be the integrated circuit 410 of FIG. 4.

Figure 4:
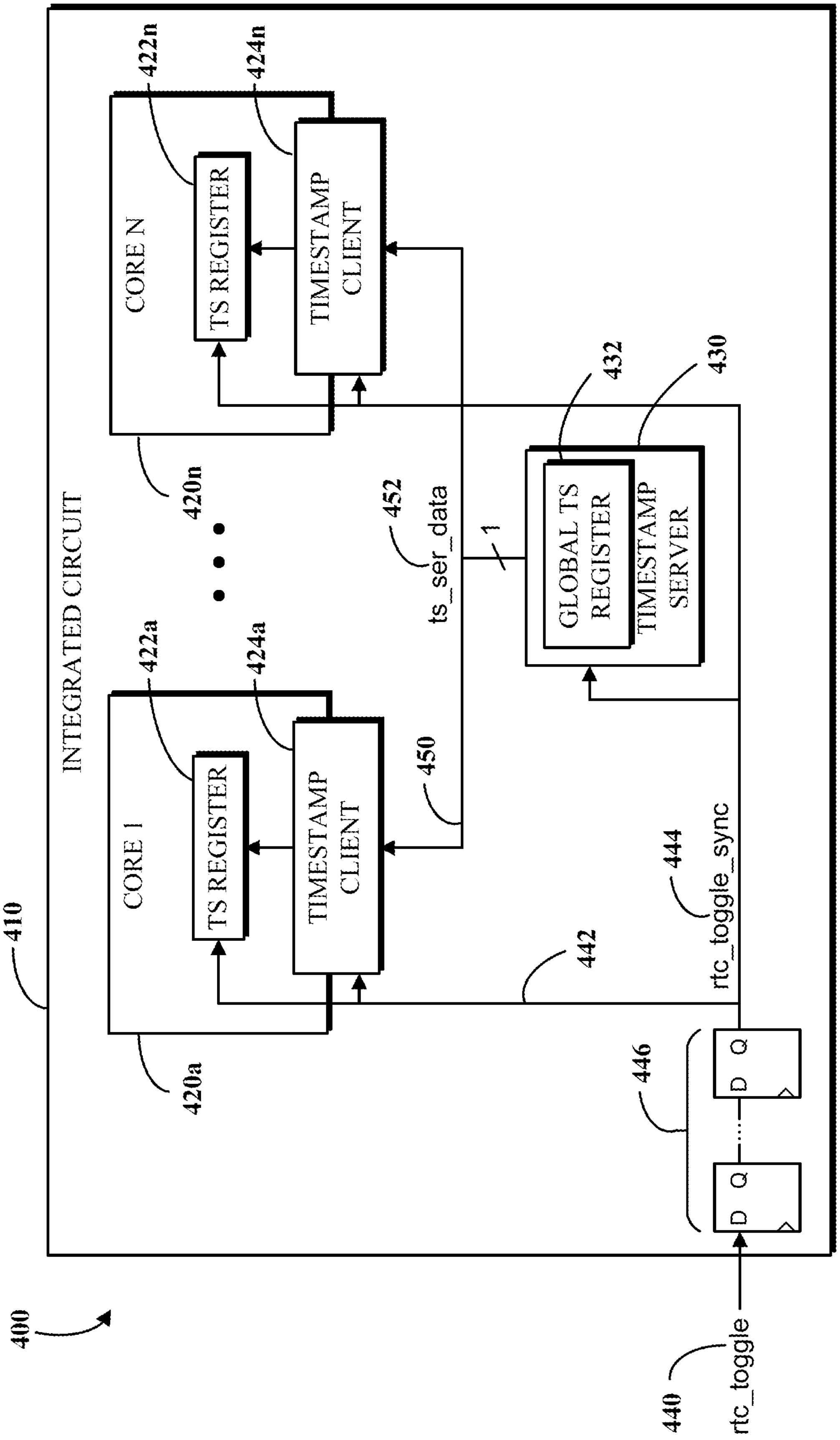
FIG. 4 is a block diagram of an example of an integrated circuit for serial wire timer distribution with multiple cores, each with its own respective timestamp register and timestamp client circuitry for receiving timestamps via a serial interface.

FIG. 4 is a block diagram of an exemplary system 400 including circuitry comprising a single timestamp server 430 and a plurality of N timestamp clients 424*a* through 424*n*. The timestamp server 430 may be, for example, the timestamp server circuitry 360 shown in FIG. 3, and each of the N timestamp clients 424*a* through 424*n* may be, for example, the timestamp client circuitry 350 shown in FIG. 3. Each timestamp client 424*a* through 424*n* may be electrically coupled to or otherwise associated with a respective core 420*a* through 420*n* of the system 400.

The timestamp server 430 may comprise a global timestamp register 432 that is adapted to store a global timestamp. The global timestamp may be established and/or updated via a timestamp timer, or counter, not shown in FIG. 4. Timestamp clients 424*a* through 424*n* are each adapted to receive a same timestamp serialized data signal, ts_ser_data, on a timestamp datapath 450, and to write a timestamp conveyed thereon to a respective local timestamp register 422*a* through 422*n*. The timestamp datapath 450 may include, for example, the first conductor 340 of FIG. 3. In some implementations, the timestamp stored in each local timestamp register 422*a* through 422*n* is a local copy, or version, of the system's global timestamp that may be stored in the global timestamp register 432. In some implementations, the timestamp datapath 450 may be 1-bit wide. In some implementations, there may be latches, flip-flops, buffers, and/or other combinational and/or sequential circuit elements on the timestamp datapath 450 to, for example, buffer, amplify, and/or synchronize the ts_ser_data signal conveyed thereon.

In some implementations, the global timestamp may be transmitted synchronously on the timestamp datapath 450 with a determined relationship to a reference clock 444, referred to as rtc_toggle_sync in FIG. 4, which is conveyed on a conductor 442. In some implementations, the reference clock 444 may be derived from an external signal 440 that is derived external to the integrated circuit 410, referred to as rtc_toggle in FIG. 4. The external signal 440 may traverse one or more combinational and/or sequential circuit elements, such as a sequence of flip-flops 446 as shown in FIG. 4, to, for example, condition, buffer, amplify, or synchronize the external signal 440; increase or decrease a frequency of the external signal 440; modify a duty cycle of the external signal 440; and so on, to transform the external signal 440 (rtc_toggle) into the reference clock 444 (rtc_toggle_sync).

Figure 5:
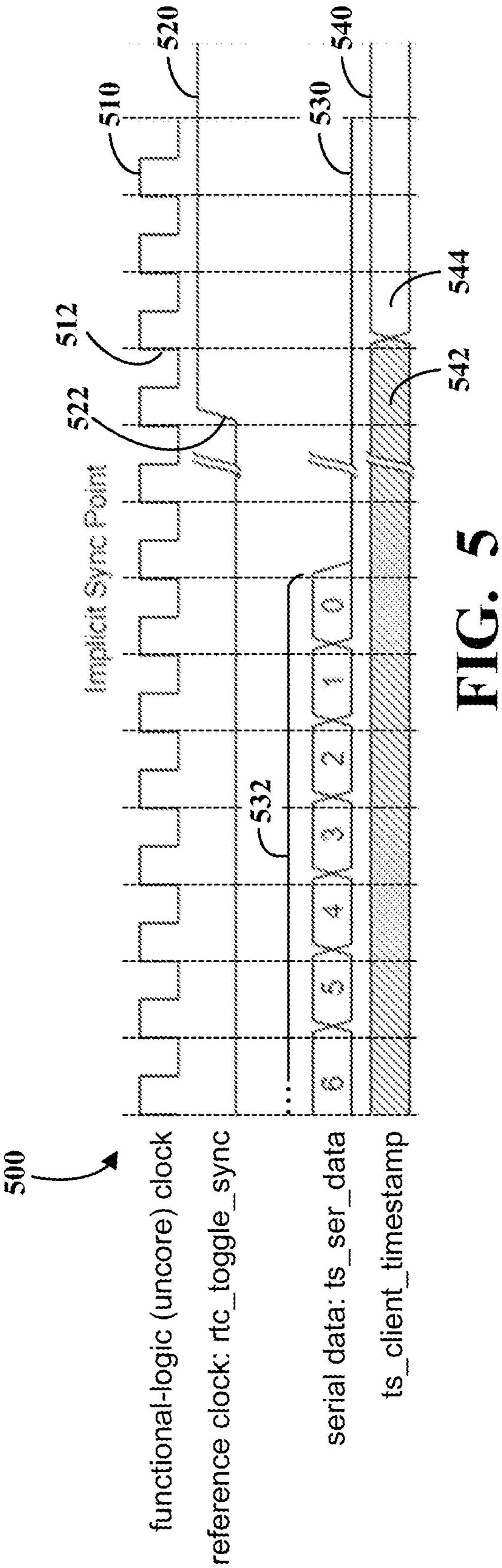
FIG. 5. is a waveform diagram depicting a portion of an example of a transmission procedure for serial wire timer distribution in an integrated circuit.

FIG. 5 is a waveform diagram 500 depicting a portion of an exemplary transmission procedure of a global timestamp in an SoC like the system 400 shown in FIG. 4. In some implementations, a functional-logic clock 510 may be a clock signal adapted for use by certain synchronous logic circuitry, such as the timestamp server 430 and the timestamp clients 424*a* through 424*n*, which are adapted for transmission and receipt of the global timestamp, respectively. The functional-logic clock 510 may sometimes be referred to as an "uncore" clock. In some implementations, respective core clock frequencies may be higher than the uncore clock frequency. In some implementations, a reference clock 520, labeled as rtc_toggle_sync in FIG. 5, may be a clock signal adapted for use in determining a synchronization point with respect to a transmission of a global timestamp from the timestamp server 430 to the timestamp clients 424*a* through 424*n* via the timestamp datapath 450. The reference clock 520 may be, for example, the reference clock 444 shown in FIG. 4 conveyed on conductor 442. In some implementations, the frequency of the functional-logic (uncore) clock 510 may be higher than the frequency of the reference clock 520.

In implementations where the timestamp datapath 450 is 1-bit wide, the global timestamp may be serialized via the timestamp server 430, transmitted serially via the timestamp datapath 450 as a serialized signal 530 according to the functional-logic (uncore) clock 510, and deserialized at each timestamp client 424*a* through 424*n* for storage in local timestamp registers 422*a* through 422*n*, respectively. In some implementations, the serialized timestamp may be transmitted in a manner (e.g., via a protocol) similar to that of a universal asynchronous receiver transmitter (UART), where a message may comprise a plurality of frames each with a start bit, a quantity of data bits, and zero or more stop bits. For example, serially transmitting a 64-bit global timestamp via a UART message may entail transmitting a 72-bit message comprising 8 frames, where each frame consists of one start bit and 8 data bits (and no stop bits). The waveform diagram 500 of FIG. 5 shows only the final 7 bits (bits 6 through 0) of a serially transmitted message represented by serialized signal 530. In some implementations, at most one bit is transmitted per period of the functional-logic (uncore) clock 510, e.g., one bit per clock period. In some implementations, multiple bits may be transmitted per period of the functional-logic (uncore) clock 510, e.g., one bit per half clock period as in double data rate logic clocked on both rising and falling edges.

At least because there may be no established phase or frequency relationship between the respective core clocks of the cores 420*a* through 420*n* and the functional-logic (uncore) clock 510, an edge of the reference clock 520 may be utilized to determine a synchronization point after completion of transmission of the global timestamp. In some implementations, like that shown in FIG. 5, a rising edge 522 of the reference clock 520 may be utilized to determine the synchronization point. In some implementations, like that shown in FIG. 5, synchronization may occur at a first rising edge 512 of the functional-logic (uncore) clock 510 following the rising edge of the reference clock 520. Prior to this rising edge 512, the locally stored timestamp in each timestamp client register 422*a* through 422*n* may be invalid, stale, or not yet updated, as represented by the shaded portion 542 of waveform 540. Immediately or shortly after this rising edge 512, the locally stored timestamp in each timestamp client register 422*a* through 422*n* may be valid, fresh, or updated, as represented by the unshaded portion 544 of waveform 540. The valid, fresh, or updated timestamp is a local copy of the global timestamp, as described in more detail later herein. In some implementations, the rising edge 512 triggers a parallel writing of the received timestamp to each local timestamp register 422*a* through 422*n*. After such register writing, each timestamp client 424*a* through 424*n* may begin incrementing its locally stored copy of the global timestamp according to the reference clock 520. Because the timestamp server 430 and each timestamp client 424*a* through 424*n* increment their own locally stored copies of the global timestamp according to the same high-precision reference clock 520, they all maintain the same value of time.

Sending the global timestamp from the global timestamp register 432 to the respective local timestamp registers 422*a* through 422*n* via a 1-bit timestamp datapath 450 may incur a non-zero delay comprising at least a certain quantity of periods of the functional-logic (uncore) clock 510 that may be used for timestamp data serialization. This delay may depend on several factors, including the number of bits of the global timestamp that are transmitted; a pipeline delay of the timestamp datapath 450 comprising a quantity of sequential circuit elements on the timestamp datapath 450 (e.g., flip-flops or latches); and a ratio of the frequencies of the reference clock 520 to the functional-logic (uncore) clock 510. Thus, for each local timestamp register 422*a* through 422*n* to store an accurate version of the global timestamp (which is stored in the global timestamp register 432)—such that all timestamp clients 424*a* through 424*n* have an identical value of time—an "offset" may be added to the global timestamp prior to transmission. In some implementations, the offset may be computed as follows:

$$\text{offset}=\text{ceiling}[(tx\_\text{cycles}+\text{pipeline})*F\_rtc\_\text{toggle\_sync}/F\_\text{uncore}+1]$$

where tx_cycles is a quantity of clock periods of the functional-logic (uncore) clock 510 required to transmit the global timestamp from a server to the client(s); pipeline is a quantity of sequential circuit elements (e.g., timing flip-flops) on the timestamp datapath 450 between the server and each client(s); F_rtc_toggle is the frequency of the reference clock 520, rtc_toggle_sync; and F_uncore is the frequency of the functional-logic (uncore) clock 510. The sum of the global timestamp and the offset may be referred to as an offset timestamp.

Figure 6:
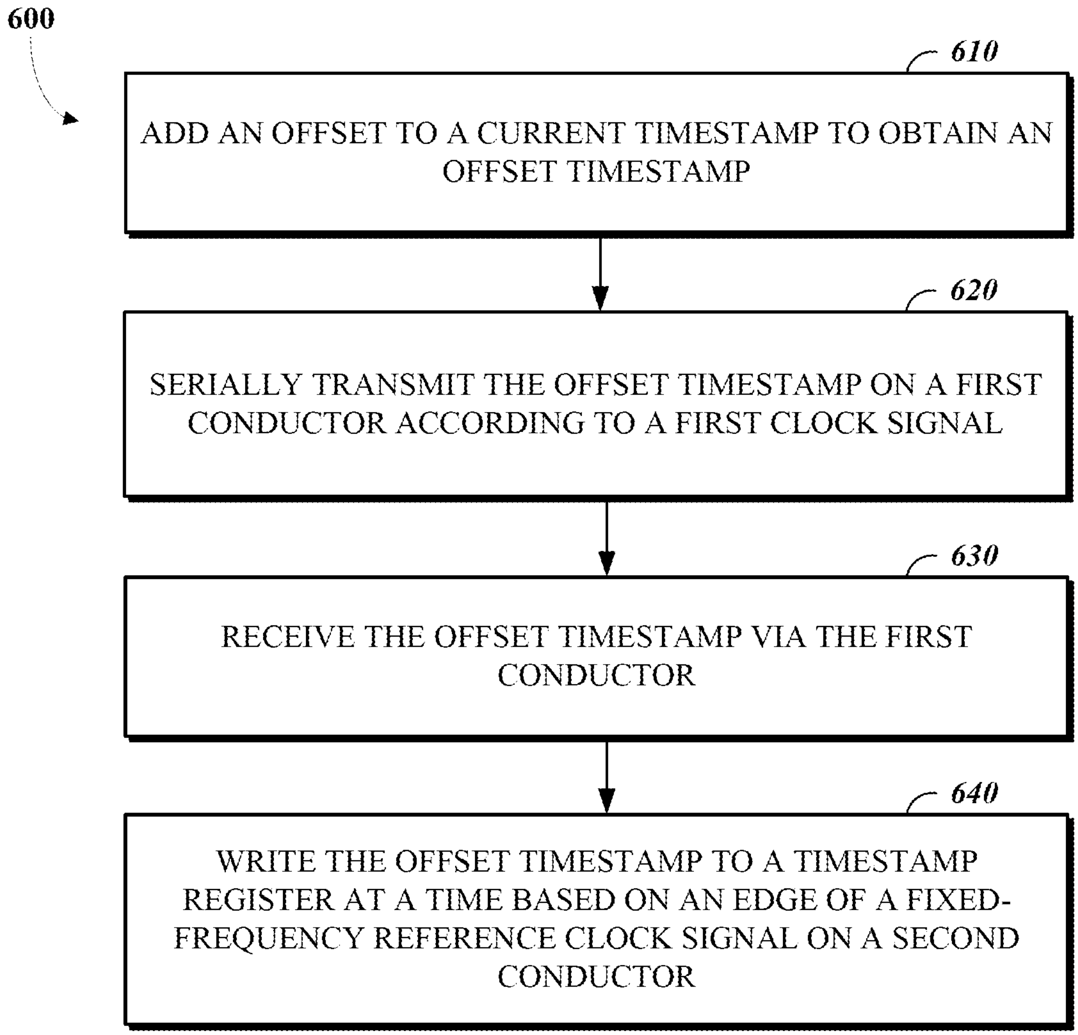
FIG. 6 is a flowchart of an example of a process for serial wire timer distribution in an integrated circuit.

FIG. 6 is a flowchart of an example of a process 600 for serial wire timer distribution in accordance with the above-described implementations. In step 610, an offset is added to a current timestamp to obtain an offset timestamp. The current timestamp may be a global timestamp stored in the global timestamp register 432, and adding the offset to the current timestamp may be accomplished via the timestamp server 430. In step 620, the offset timestamp is serially transmitted on a first conductor according to a functional-logic clock signal. The first conductor may be included in the timestamp datapath 450, and the functional-logic clock signal may be the functional-logic clock 510. In step 630, the offset timestamp is received via the first conductor. The offset timestamp may be received by timestamp clients 424*a* through 424*n*. In step 640, the offset timestamp is written to a timestamp register at a time determined by an edge of a fixed-frequency reference clock signal on a second conductor 442. The offset timestamp may be written to timestamp registers 422*a* through 422*n*. The fixed-frequency reference clock signal may be the reference clock 520, and the edge thereof may be the rising edge 522. The time determined by the rising edge 522 may correspond to a first rising edge 512 of the functional-logic clock 510 following the rising edge 522 of the reference clock 520.

In some implementations, the offset is determined based on a ratio of a frequency of the fixed-frequency reference clock signal, e.g., reference clock 520, to a frequency of the functional-logic clock signal, e.g., functional-logic clock 510. For example, the fixed-frequency reference clock signal may have a frequency of 100 MHz and the functional-logic clock signal may have a frequency of 500 MHz. Thus, a ratio of the fixed-frequency reference clock signal to the functional-logic clock signal would be 100 MHz/500 MHz=⅕, or 0.20.

In some implementations, the offset is determined based on a quantity of clock cycles of the functional-logic clock signal, e.g., functional-logic clock 510.

In some implementations, the process 600 further includes determining the offset based on a quantity of sequential circuit elements on a datapath that includes the first conductor, where the datapath may be the datapath 450 of FIG. 4.

In some implementations, the timestamp register, e.g., timestamp registers 422*a* through 422*n*, are each control status registers of respective processor cores, e.g., processor cores 420*a* through 420*n*.

In some implementations, each timestamp register 422*a* through 422*n* is configured to be accessed by a respective processor core 420*a* through 420*n*, in a fixed or otherwise known number of clock cycles of a clock signal used by the respective processor core 420*a* through 420*n*.

In some implementations, the offset timestamp is serially transmitted within a fixed or otherwise known number of periods of the fixed-frequency reference clock signal, e.g., reference clock 520.

In some implementations, the process 600 further includes receiving the offset timestamp, via the first conductor, at multiple timestamp client circuitries; and writing the offset timestamp to multiple respective timestamp registers at a time based on an edge of the fixed-frequency reference clock signal.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An integrated circuit comprising:

a processor core including a timestamp register configured to store a timestamp;

a first conductor configured to bear a timestamp signal serialized according to a first clock signal;

a second conductor configured to bear a fixed-frequency reference clock signal that has a lower frequency than the first clock signal;

a timestamp server circuitry configured to add an offset to a current timestamp to obtain an offset timestamp, and to serially transmit the offset timestamp on the first conductor; and a timestamp client circuitry configured to receive the offset timestamp via the first conductor, and to write the offset timestamp to the timestamp register at a time based on an edge of the fixed-frequency reference clock signal.

2. The integrated circuit of claim 1, wherein the timestamp server circuitry is configured to determine the offset based on a ratio of a frequency of the fixed-frequency reference clock signal to a frequency of the first clock signal.

3. The integrated circuit of claim 1, wherein the timestamp server circuitry is configured to determine the offset based on a quantity of clock cycles of the first clock signal.

4. The integrated circuit of claim 1, wherein the timestamp server circuitry is configured to determine the offset based on a quantity of sequential circuit elements on a datapath between the timestamp server circuitry and the timestamp client circuitry that includes the first conductor.

5. The integrated circuit of claim 1, wherein the timestamp server circuitry is configured to determine the offset based on a value stored by software in a register.

6. The integrated circuit of claim 1, wherein the timestamp register is configured to be accessed by the processor core in a fixed or otherwise known number of clock cycles of a clock signal used by the processor core.

7. The integrated circuit of claim 1, comprising:

multiple processor cores including respective timestamp registers configured to store a timestamp; and multiple timestamp client circuitries configured to receive the offset timestamp via the first conductor, and to write the offset timestamp to the respective timestamp registers at a time based on an edge of the fixed-frequency reference clock signal.

8. A method, comprising:

adding an offset to a current timestamp to obtain an offset timestamp;

serially transmitting the offset timestamp on a first conductor according to a first clock signal;

receiving the offset timestamp via the first conductor; and writing the offset timestamp to a timestamp register at a time based on an edge of a fixed-frequency reference clock signal on a second conductor.

9. The method of claim 8, further comprising determining the offset based on a ratio of a frequency of the fixed-frequency reference clock signal to a frequency of the first clock signal.

10. The method of claim 8, further comprising determining the offset based on a quantity of clock cycles of the first clock signal.

11. The method of claim 8, further comprising determining the offset based on a quantity of sequential circuit elements on a datapath that includes the first conductor.

12. The method of claim 8, wherein the timestamp register is configured to be accessed by a processor core in a fixed or otherwise known number of clock cycles of a clock signal used by the processor core.

13. The method of claim 8, comprising:

receiving the offset timestamp, via the first conductor, at multiple timestamp client circuitries; and writing the offset timestamp to multiple respective timestamp registers at a time based on an edge of the fixed-frequency reference clock signal.

14. A non-transitory computer readable medium comprising a circuit representation that, when processed by a computer, is used to program or manufacture an integrated circuit, the integrated circuit comprising:

a processor core including a timestamp register configured to store a timestamp;

a first conductor configured to bear a timestamp signal serialized according to a first clock signal;

a second conductor configured to bear a fixed-frequency reference clock signal that has a lower frequency than the first clock signal;

a timestamp server circuitry configured to add an offset to a current timestamp to obtain an offset timestamp, and to serially transmit the offset timestamp on the first conductor; and a timestamp client circuitry configured to receive the offset timestamp via the first conductor, and to write the offset timestamp to the timestamp register at a time based on an edge of the fixed-frequency reference clock signal.

15. The non-transitory computer readable medium of claim 14, wherein the timestamp server circuitry is configured to determine the offset based on a ratio of a frequency of the fixed-frequency reference clock signal to a frequency of the first clock signal.

16. The non-transitory computer readable medium of claim 14, wherein the timestamp server circuitry is configured to determine the offset based on a quantity of clock cycles of the first clock signal.

17. The non-transitory computer readable medium of claim 14, wherein the timestamp server circuitry is configured to determine the offset based on a quantity of sequential circuit elements on a datapath between the timestamp server circuitry and the timestamp client circuitry that includes the first conductor.

18. The non-transitory computer readable medium of claim 14, wherein the timestamp server circuitry is configured to determine the offset based on a value stored by software in a register.

19. The non-transitory computer readable medium of claim 14, wherein the timestamp register is configured to be accessed by the processor core in a fixed or otherwise known number of clock cycles of a clock signal used by the processor core.

20. The non-transitory computer readable medium of claim 14, wherein the integrated circuit comprises:

multiple processor cores including respective timestamp registers configured to store a timestamp; and multiple timestamp client circuitries configured to receive the offset timestamp via the first conductor, and to write the offset timestamp to the respective timestamp registers at a time based on an edge of the fixed-frequency reference clock signal.

* * * * *